Jan. 12, 1971   W. H. KIRK   3,554,046
POSITIONING MECHANISM FOR MACHINE TOOL
Filed May 14, 1969   2 Sheets-Sheet 1
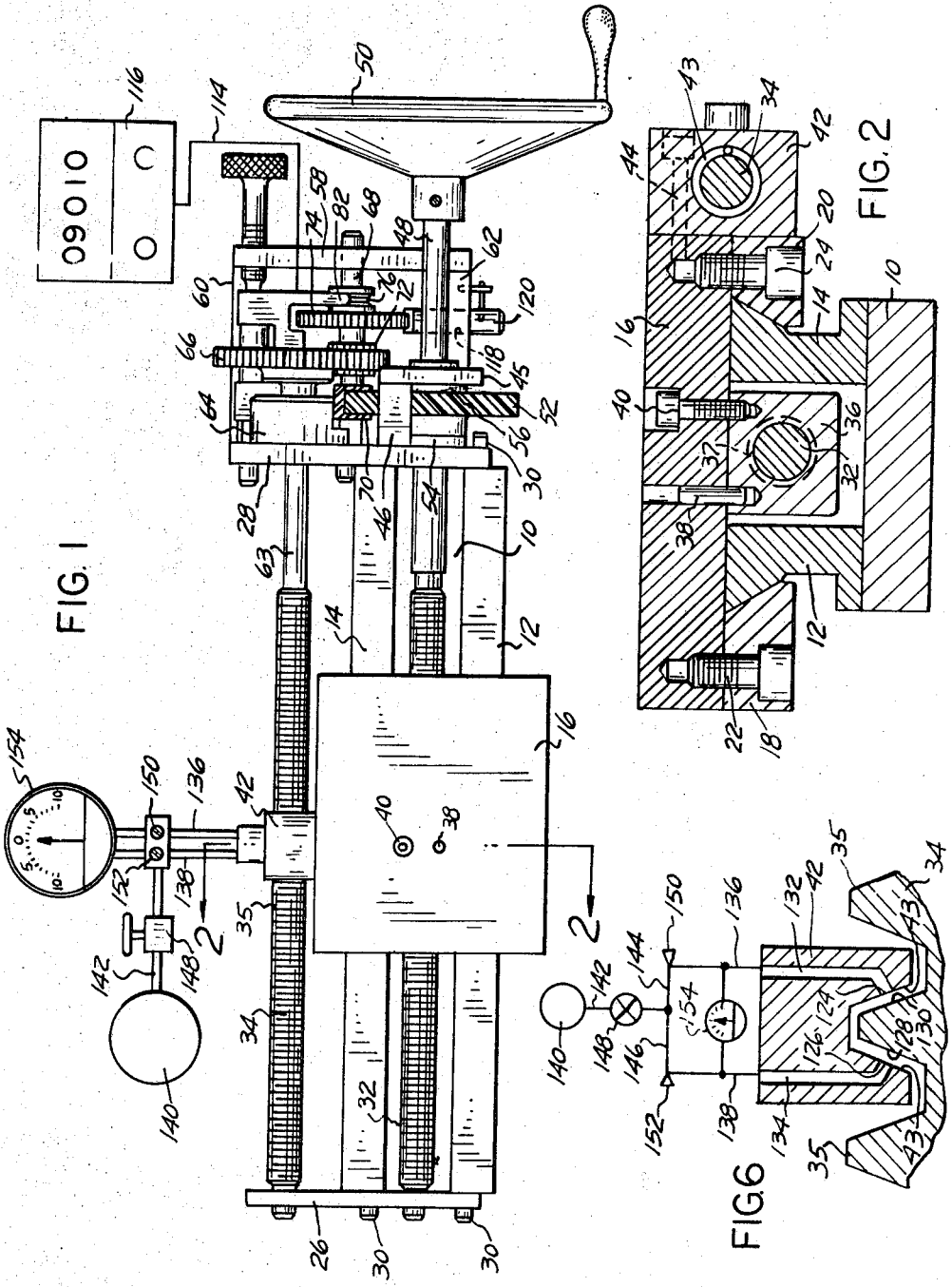
INVENTOR
WILLIAM H. KIRK
ATTORNEYS

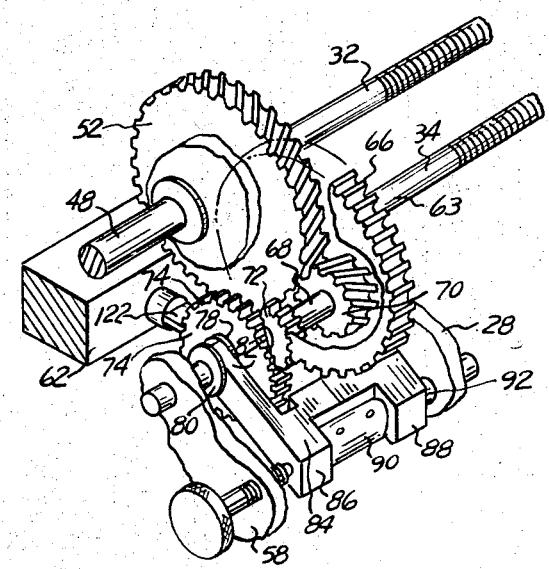
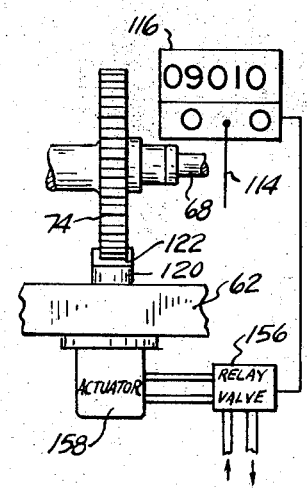
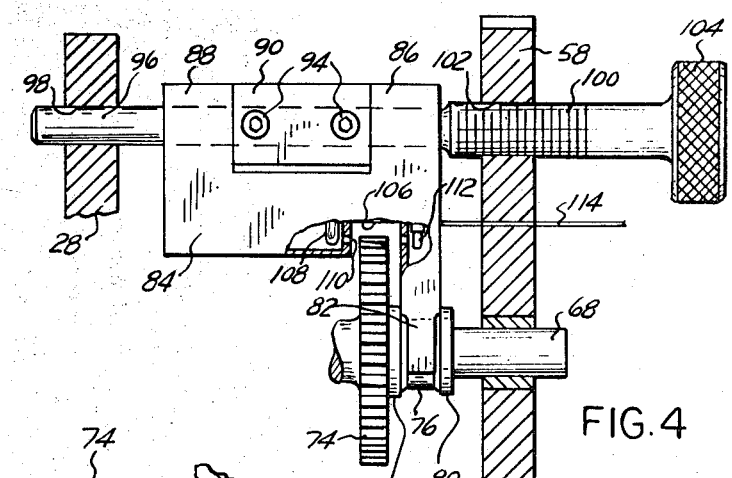
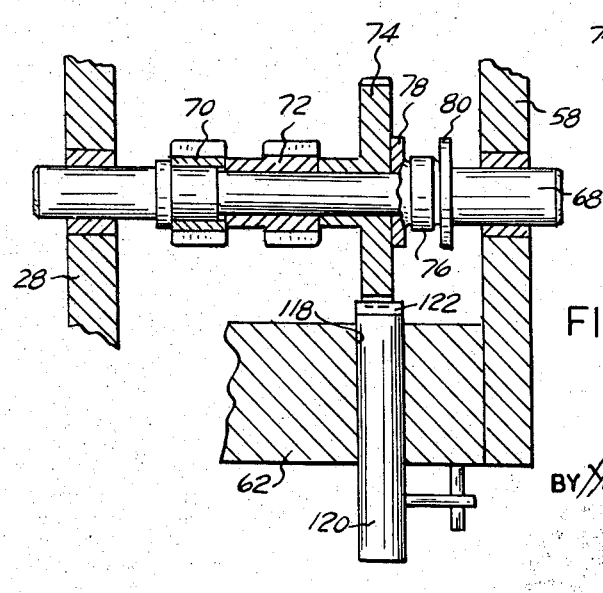

United States Patent Office 3,554,046
Patented Jan. 12, 1971

3,554,046
POSITIONING MECHANISM FOR MACHINE TOOL
William H. Kirk, 1109 W. Selfridge,
Clawson, Mich. 48017
Filed May 14, 1969, Ser. No. 824,402
Int. Cl. F16h *1/18, 55/18*
U.S. Cl. 74—424.8
9 Claims

ABSTRACT OF THE DISCLOSURE

A positioning mechanism for machine tools and the like having a stationary bed provided with slideways and a slide supported by the slideways for linear displacement relatively to the bed. The slide is linearly displaced by means of a feed screw engaging a nut affixed to the slide; a second or master screw is straddled by a second nut-like member also affixed to the slide. Both screws are rotated in unison by way of a gear train consisting of a helical gear wheel keyed on the shaft of the feed screw meshing with a helical gear keyed on a countershaft, the countershaft having a spur gear keyed thereon meshing with a spur wheel keyed on the shaft of the master screw. A toothed wheel is also mounted on the countershaft for rotation thereby, and each incremental rotation of the toothed wheel corresponding to a unit of displacement of the slide is counted by means of appropriate counting means from a zero reference. Once the slide has been displaced to an appropriate position as indicated by the counting means, the countershaft is locked against rotation and is linearly displaced such that the interaction between the inclined teeth of the helical gear and of the helical wheel rotates the feed screw of a minute amount, while the master screw is held stationary, until an appropriate null indicating device gives an indication that the nut-like member cooperating with the master screw straddles evenly the corresponding side faces of the threads of the master screw. The slide is thus exactly positioned at a repetitive required position irrespective of any backlash in the feed screw-nut assembly.

BACKGROUND OF THE INVENTION

The present invention belongs to the field of positioning devices for machine tools and the like wherein it is desired to position a carriage or slide relatively to a stationary bed at a precise position with respect to a zero reference or starting position. The slide may carry a tool which is positionable relatively to a workpiece or the slide may carry a workpiece which is positionable relatively to a tool.

In slide or carriage positioning devices utilizing a rotatable feed screw engaging a nut affixed to the slide or carriage, accurate linear positioning of the slide or carriage is difficult to determine with precision in view of the backlash existing between the threads of the feed screw and the threads of the nut affixed to the slide or carriage, such backlash being the result of necessary clearance between the male thread of the feed screw and the female thread of the nut, the feed screw thrust bearing clearance causing axial displacement of the feed screw as a result of the feed nut axial reaction forces, and normal torsional and longitudinal strains in the feed screw. The backlash becomes increasingly variable with use of the machine with the result that auxiliary position indicating systems dependent from the movable slide and from the stationary bed are often required in order to determine the exact position of the slide with the accuracy necessary in modern precision machining. The problem is present whether the feed mechanism for the slide is under manual control, or under automatic control as provided by automatic feed, numerical control systems and the like.

SUMMARY

The present invention permits to obtain a high degree of accuracy and repetitiveness in the positioning of a slide relatively to a stationary bed in machine tools and the like, by simple mechanical means operable under manual control or automatic machine control. The principal object of the invention is achieved by providing mechanical means for translating and positioning the slide consisting of a substantially conventional feed screw and nut assembly coupled with a position displaying device and a precision position generating and controlling mechanism.

The many objects and advantages of the present invention will become apparent when the following description of an example of the best mode contemplated to practice the invention is read in conjunction with the accompanying drawings wherein like reference numerals refer to like parts and in which:

BRIEF DESCRIPTION OF THE DRAWINGS

FIG. 1 is a top plan view of an example of positioning device for machine tools and the like according to the present invention;

FIG. 2 is a transverse sectional view from line 2—2 of FIG. 1;

FIG. 3 is a schematic fragmentary perspective view of the gear train arrangement of the positioning device of FIG. 1;

FIG. 4 is a fragmentary top view of part of the gear train assembly of FIG. 3;

FIG. 5 is a further fragmentary top view of part thereof;

FIG. 6 is a schematic representation of the null indicating portion of the positioning device of the invention; and FIG. 7 is a schematic representation of a partial modification of the invention.

DETAILED DESCRIPTION OF THE PREFERRED EMBODIMENT

Referring to the drawings, and more particularly to FIGS. 1 and 2 thereof, an example of positioning device according to the present invention comprises a stationary elongated bed 10 for a machine tool and the like, provided with a pair of parallel slideways 12 and 14 fastened on top of the bed 10 by any conventional means such as bolts, not shown, or the like. A slide or carriage 16 is supported on the top of the slideways 12–14 in the usual manner for linear sliding displacement relatively thereto and is held against lateral displacement by means of side thrust bearing blocks 18 and 20 held in position by means such as bolts 22 and 24, as best seen in FIG. 2. It is obvious that any appropriate arrangement may be used in the slide-slideways assembly, such as supporting the slide from the slideways by means of fluid bearings, linear roller bearings, recirculating linear ball bearings, etc., as well as by the plain bearings arrangement shown in the drawings.

As best shown in FIG. 1, at each end of the assembly formed by the bed 10 and the slideways 12–14 there is a vertically disposed end plate, as shown at 26 and 28, fastened thereto by means such as bolts 30. A pair of parallel identical lead screws 32 and 34 having threads of equal pitches are adapted to journal in appropriate support bearings in the end plates 26 and 28, the lead screw 32 defining a feed screw by being engaged in a nut 36, best seen in FIG. 2, fastened to the bottom of the slide 16, between the two parallel slideways 12 and 14, by conventional means such as one or two pins as shown at 38 and one or two bolts as shown at 40. A nut-like member 42 is affixed to the slide 16, for example on one side thereof, by conventional means such as one or a pair of pins, not shown, and bolts such as bolt 44. The nut-like member 42 is provided with an internal thread 43, best seen in FIG. 6, adapted to normally surround or straddle the thread 35 of the lead or master screw 34 without engaging such thread, in the manner and for the purpose to be explained hereinafter.

It will be appreciated that the present invention contemplates utilizing a lead screw for the feed screw 32 which is of normal nominal commercial quality with respect to its accuracy of pitch and thread form, and that such feed screw is not required to have exceptional accuracy of construction as would normally be necessary for positioning a slide or carriage in a high precision machine tool. The second lead screw, or master screw 34, is preferably of a high gage quality with respect to accuracy of pitch and thread form, in order to provide the high positioning accuracy contemplated by and expected from the present invention. The high quality of the master screw 34 is maintained practically indefinitely under normal operating conditions in view of the fact that the master screw 34 plays no part in the actual positioning of the slide 16, is not subjected to stress or wear as its thread 35 never engages the thread 43 of the cooperating nut-like member 42. The cooperating nut-like member 42 is a nut-like member in shape only and not in function, as its thread 43 does not engage the thread 35 of the master screw 34, and the nut-like member itself does not perform any feeding function for the slide 16. The nut-like member 42 serves only as a convenient holder for means to determine the axial displacement of the master screw 34 relatively to such means, as will be hereinafter explained in details.

The nut 36, affixed to the slide 16, and cooperating with the feed screw 32 accomplish the normal feed function of the slide 16 relative to the feed screw 32, and has an internal thread having a sideface continuously engaged with the feed screw thread during translation of the slide 16 relatively to the bed 10.

As best shown in FIG. 1, the end plate 28 supports in turn a parallelly disposed support plate 45 spaced therefrom by means such as a spacer block 46, and the feed screw 32 is provided with an integral projecting shaft portion 48 adapted to journal in an appropriate bearing disposed in support plate 45 in alignment with the bearing in the end plate 28, and a hand wheel 50, or other appropriate driving mechanism, is mounted on the end of the projecting shaft portion 48 of the feed screw 32 for driving the feed screw in rotation. Between the end plate 28 and the support plate 45 there is a helical gear wheel 52 keyed on the projecting shaft portion 48 of the feed screw 32, adequate thrust bearings being disposed between the end plate 28 and the helical gear wheel 52, and the helical gear wheel and the support plate 45, as shown respectively at 54 and 56.

A tail plate 58 is mounted parallel to both the end plate 20 and support plate 45 in space relationship therewith, being supported by means such as elongated block spacers 60 and 62, the elongated block spacers 60 and 62 being fastened to the end plate 28, to the support plate 49, and to the tail plate 58, respectively, by any conventional means such as screws or the like, not shown.

The master screw 34 is provided with an integral projecting shaft portion 63 projecting through a bearing 64 mounted on one side of the end plate 28 and providing adequate journal support for the projecting shaft portion 64 of the master screw 34 and also providing adequate longitudinal thrust support including the elimination of axial displacement of the master screw by well known means such as pre-loaded precision ball bearings. The end of the projecting shaft portion 63 of the master screw 34 has a spur gear wheel 66 keyed thereon for rotation in unison therewith. A countershaft 68 is adapted to journal at one end in a bearing in the tail plate 58 and at the other end in an appropriate bearing in the end plate 28. The countershaft 68 is free to longitudinally slide in its support bearings in the tail plate 58 and the end plate 28, and the axis of the countershaft 68 is parallel to the axis of the master and feed screws 34 and 32. The countershaft 68 supports an helical pinion 70 constantly meshing with the helical gear wheel 52 and a spur pinion 72 constantly meshing with the spur gear wheel 66, the helical pinion and the spur pinion being each adequately keyed on the countershaft 68 so as to be caused to rotate in unison therewith. The diameter of the spur gear wheel 66 is equal to the diameter of the helical gear wheel 52 and the diameters of both the helical pinion 70 and the spur pinion 72 are equal, such that the gear train formed by the helical wheel 52, the helical pinion 70, the spur pinion 72 and the spur gear wheel 66 has a total gear ratio of one-to-one, and it is obvious that when the feed screw 32 is rotated by means of the hand wheel 50, the master screw 34 is also rotated of the same angular amount. The countershaft 64 also supports a toothed wheel 74 keyed thereto for a purpose to be hereinafter explained.

As generally shown in FIG. 1 and as best shown in FIGS. 3–5, the countershaft 68 is normally held against longitudinal displacement by being provided with an integral spool portion 76 disposed between two annular flanges 78 and 80, adapted to engage the projecting fork portion 82 of a block member 84. The block member 84 has a pair of bifurcated leg portions 86 and 88 between which is disposed a sleeve member 90 fastened to a shaft 92, by means such as set screws 94, one end of shaft 92, as shown at 96, being disposed so as to journal and be longitudinally slidable through a bore 98 in the end plate 24. The shaft 96 is longitudinally displaceable as a result of a micrometer-like arrangement comprising the other end of the shaft 96 provided with a threaded portion 100 threading through an appropriate threaded bore 102 in the tail plate 58. A knurled head 104 is integral with or affixed to the end of the shaft 96 projecting beyond the tail plate 58 for the purpose of permitting manual rotation of the shaft 96 which is thus caused to be longitudinally displaced and to carry with it block member 84 such that the projecting fork portion 82 thereof, constantly engaging the spool portion 76 between the annular flanges 78 and 80 on the countershaft 68, causes a longitudinal displacement of the countershaft 68.

The block member 84 has a recess 106, as best shown in FIG. 4, into which projects the edge of the toothed wheel 74. Within the block member 84, on one side of the recess 106, is mounted a light bulb 108 adapted to project a beam of light, through a window or aperture 110 on the sidewall of the recess 106, towards a detector 112 consisting of a photocell or the like, the detector 112 being connected by way of a line 114 to a pulse counter 116, FIG. 1. In this manner, when the hand wheel 50 is rotated, thus rotating the feed screw 32 and the master screw 34 in unison through the gear train formed by helical gear wheel 52, helical pinion 70, spur pinion 72 and spur gear wheel 66, the toothed wheel 74 mounted on the countershaft 68 is also rotated, and the beam of light emitted by the light bulb 108 is repetitively interrupted each time one of the teeth on the edge of the toothed wheel passes in front of the window or aperture 112. The light beam interruption is detected by the detector 112 which supplies at its output an electric pulse which is applied to the counter 116, causing the counter to advance of one count. An example of counter for use in the present invention is Digital Counter Model 5331 made by Hewlett-Packard Co. Appropriate power supplies for the light bulb 108 and the photocell 112 and an adequate pulse amplifier are provided, although not shown for the sake of simplification of the description of the invention. The diameter of toothed wheel 74 and the number of teeth thereon may be such that each tooth represents an increment of rotation of the screws 32 and 34 corresponding to an incremental advance of the slide or carriage 16 of any appropriate amount, such as for example .0005 in. or any other adequate value, as arbitrarily chosen.

A transverse bore 118 is disposed in the elongated spacer block 62 for receiving a slidable pin 120 having an end 122, FIG. 5, engageable between two consecutive teeth of the toothed wheel 74 such that, when the slide or carriage 16 has been translated to a position, as indicated by the numeral displayed by the counter 116, the pin 120 may be displaced so as to lock the toothed wheel 74 and consequently the countershaft 68 and the two screws 32 and 34, against rotation. The knurled head 104 on the end of the shaft 96 is then manually rotated so as to displace block member 84 longitudinally, which in turn causes a longitudinal displacement of countershaft 68 in view of the forked portion 82 of the block 84 disposed in the spool portion 76 of the countershaft being caused to engage one of the lateral annular flanges 78 or 80. The straight teeth of spur pinion 72 are slidably displaced against the straight teeth of the spur gear wheel 66 meshing therewith, such that the longitudinal displacement of the countershaft 68 causes no rotation of the spur gear wheel 66 and master screw 34. However, because of the angle of inclination of the teeth of the helical pinion 70 meshing with the inclined teeth of the helical gear wheel 52, the longitudinal displacement of the helical pinion 70 causes a minute rotation of the helical gear wheel 52 and consequently a minute rotation of the feed screw 32. The minute rotation of the feed screw 32 in turn causes a minute linear displacement of the slide or carriage 16, if the rotation of the feed screw is the same as the original rotation of the feed screw. If the block 84 is longitudinally displaced in a direction that causes rotation of the feed screw 32 in a direction opposite to that which originally caused translation of the slide 16 to the position it now occupies, linear displacement of the block 84 nevertheless results in an eventual minute linear displacement of the slide 16 after the backlash between the threads of the feed screw 32 and the threads of the nut 36, and other variables hereinbefore mentioned, has been compensated for.

As shown in FIG. 2, and as best shown schematically in FIG. 6, the nut-like member 42 fastened to the side of the slide 16 has a two small orifices 124 and 126 disposed symmetrically on the surface of the thread 43 of the nut-like member directly adjacent to the side surfaces or flanks 128 and 130 of the thread 35 of the master screw 34. The orifices 124 and 126 are connected by way of passages 132 and 134 respectively to lines 136 and 138 and fluid under pressure, such as compressed air, is supplied from a source 140 via a line 142 to two separate branches 144 and 146 at a predetermined pressure as determined by the setting of a pressure regulating valve 148. A pair of adjustable needle valves 150 and 152 permit to calibrate the system by adjusting to substantially equal values the air flows into lines 136 and 138 respectively. A null indicating means consisting of, for example, a differential pressure indicating gauge 154 is connected between lines 136 and 138, such that the differential pressure indicating gauge 154 provides a visual display of the difference in pressures of the fluid flowing respectively in line 136 and in line 138, such pressures being dependent from the gap at the orifices 124 and 126, respectively, or spacing between the orifices and the surfaces 128 and 130, respectively, of the sides of the thread 35 of the master screw 34 surrounded or straddled by the nut-like member 42. Consequently, when the thread 43 of the nut-like member 42 is positioned relatively to the thread 35 of the master screw 34 such that the thread of the nut-like member and the thread of the master screw are evenly spaced with equal clearances between the nut-like member thread surfaces and the screw thread surfaces on both sides of the screw thread, the differential pressure gauge 154 provides a visual indication of equal pressure in lines 136 and 138.

Consequently, when the knurled head 104 on the end of the shaft 92 is rotated, as previously explained, this in turn causes a minute rotation of the feed screw 32 which in turn linearly displaces the carriage 16 of a minute amount, while the master screw 34 is held stationary, until a null or zero deviation is indicated at the gauge 154. The slide 16 is thus correctly and firmly positioned irrespective of any wear or backlash that may exist between the feed screw 32 and the nut 36 as soon as the nut-like member 42 is positioned relatively to the master screw 34 with all around equal clearance between the thread of the nut-like member and the thread of the screw. Consequently, each time the carriage 16 is repositioned to the same position as shown by the total count on the counter 116, with the carriage 16 being further displaced by manipulating the knurled knob 104 until a null is displayed on the differential gauge 154, the carriage 16 is repositioned to the same position as previously achieved.

It will be appreciated by those skilled in the art that other means than the air orifices in the nut-like member 42 could be used for determining the relative position between the thread 35 of the master screw 34 and the thread of the nut-like member. For example, electromagnetic proximity sensors, capacitance proximity sensors, mechanical contactors, optical devices, and other well known convenient means can be used for determining the relative position between the master screw and the nut-like member, and be utilized in a bucking or bridge arrangement for developing a null. Alternately, an absolute measurement gauge could be used instead of a null gauge arrangement, the repetitive correct fine positioning of the slide 16 being then determined when the gauge indicator provides a predetermined reading. A null indicating gauge is, however, the preferred arrangement because it permits consistent readings irrespective of any lateral displacement or lack of straightness of the master screw 34.

It will also be appreciated that, although the herein disclosed embodiment of the present invention has been described as including a feed screw 32 and a master screw 34 of substantially equal pitches interconnected for rotation in unison and in the same direction by way of a gear train of one-to-one gear ratio, the invention also contemplates using a feed screw of a different pitch from that of the master screw, the gear train interconnecting the two screws being consequently provided with a gear ratio other than one-to-one, such as to accomplish the same results as those provided by the hereinbefore described example of a structural embodiment of the invention.

As shown in FIG. 7, the counter 116 may be arranged to trip a solenoid relay valve 156 adapted to introduce fluid into the cylinder of a fluid operated actuator 158 arranged to actuate the pin 120 such that, as soon as an appropriate count is reached as displayed by the counter 116, the pin 120 is actuated to engage the toothed wheel 74, thus making the operation of the device of the invention somewhat automatic.

It can thus be seen that the positioning device of the invention provides for means for repetitively positioning a movable carriage or slide in a machine tool or the like to a precisely determined position, irrespective of any wear, backlash, or other variables hereinbefore mentioned, that may exist in the mechanism driving the carriage or slide linearly on the machine bed slideways. Having thus described the invention by way of a structural example thereof, given for illustrative purpose only, what is claimed as new is as follows:

1. In a positioning device for a machine tool and the like, in combination a stationary bed provided with slideways, a slide supported by said slideways for linear displacement relatively thereto, a feed screw, a nut affixed to said slide and engaged with said feed screw for linearly displacing said slide when said feed screw is rotated, a second screw disposed parallel to said feed screw, a member affixed to said slide and having a portion spaced apart from the threads of said second screw, means for rotating said feed screw and second screw in unison, means for giving a count for each increment of angular rotation of said second screw, means for locking said second screw against rotation after a predetermined count corresponding to a predetermined coarse linear displacement of said slide has been obtained, means for rotating said feed screw for further finely displacing said slide and means dependent from the portion of said member for giving an indication of the distance separating said portion from the thread of said second screw.

2. The combination of claim 1 wherein the means for rotating said feed screw and second screw in unison comprises means for rotating said feed screw, a helical gear wheel keyed on said feed screw, a helical pinion mounted on a countershaft and meshing with said helical gear wheel, a spur pinion mounted on said countershaft on a common shaft with said helical pinion and a spur gear wheel keyed on said second screw and meshing with said spur pinion.

3. The combination of claim 2 wherein the means for giving a count for each increment of angular rotation of said screws comprises a toothed wheel mounted on said shaft common to said helical pinion and said spur pinion for rotation therewith, a source of light disposed on one side of said toothed wheel, a detector disposed on the other side thereof such that a beam of light emitted by said source toward said detector is interrupted each time a tooth of said toothed wheel is interposed between said source and said detector and counter means electrically connected to said detector and adapted to register a count each time said beam of light is interrupted.

4. The combination of claim 3 wherein said means for locking said second screw against rotation after a predetermined count comprises a displaceable pin member having an end portion engageable between two consecutive teeth of said toothed wheel.

5. The combination of claim 4 wherein said means for rotating said feed screw for further displacing said carriage comprises said countershaft forming said common shaft for said helical pinion, spur pinion and toothed wheel mounted linearly displaceable while held against rotation by said end portion of the pin member engaged between two consecutive teeth of said toothed wheel and micrometer screw means for controllably linearly displacing said countershaft for causing the helical pinion on said countershaft to rotate the helical gear wheel on said feed screw of a minute amount.

6. The combination of claim 1 wherein the means for giving a count for each increment of angular rotation of said screws comprises a toothed wheel rotatable in unison with said second screw, a source of light disposed on one side of said toothed wheel, a detector disposed on the other side thereof such that a beam of light emitted by said source toward said detector is interrupted each time a tooth of said toothed wheel is interposed between said source and said detector, and counter means electrically connected to said detector and adapted to register a count each time said beam of light is interrupted.

7. The combination of claim 6 wherein said means for locking said second screw against rotation after a predetermined count comprises a displaceable pin member having an end portion engageable between two consecutive teeth of said toothed wheel.

8. The combination of claim 1 wherein said means dependent from the portion of said member for giving an indication of the distance separating said portion from the thread of said second screw comprises a source of pressurized fluid, separate conduit means connecting said source to said orifices, pressure differential indicating means connected across said conduit means and adapted to give an indication of pressure equilibrium between said conduit means when said orifices are equidistant from the surface of the thread of said second screw adjacent said orifices.

9. In a positioning device for a machine tool and the like, in combination a stationary bed provided with slideways, a slide supported by said slideways for linear displacement relatively to said slideways, a feed screw having a predetermined thread, a nut member affixed to said slide and engaging said feed screw for linearly displacing said slide when said feed screw is rotated, a second screw parallel to said feed screw, a nut-like member affixed to said carriage and having a thread-like portion adapted to straddle the threads of said second screw, a first helical gear mounted on said feed screw for rotation thereby, a longitudinally displaceable countershaft, a second helical gear mounted on said countershaft and meshing with said first helical gear, a first spur gear mounted on said countershaft, a second spur gear mounted on said second screw and meshing with said first spur gear, said first and second helical gears and said first and second spur gears being so dimensioned that each increment of axial displacement of said nut-like member corresponds to an equal movement of axial thread displacement of said second screw, a toothed wheel mounted on said countershaft, each tooth of said wheel representing an increment of rotation of said countershaft, a source of light disposed on one side of said toothed wheel and a photocell disposed on the other side thereof such that a beam of light emitted by said source toward said photocell is interrupted each time a tooth of said toothed wheel is interposed between said source and said photocell, counter means electrically connected to said photocell for giving a count of a plurality of increments of rotation of said toothed wheel relatively to a base reference for supplying an indication of the displacement of said slide from an initial position, a locking pin engageable with said toothed wheel for preventing rotation of said countershaft once said carriage has been displaced to a predetermined position, means controllably longitudinally displacing said countershaft for causing the linear displacement of said second helical gear on said countershaft to rotate said first helical gear on said feed screw of a minute amount, and differential gauge means dependent from said nut-like member for displaying a null when said carriage has been linearly displaced as a result of longitudinally displacing said countershaft to a position whereby the threads of said second screw and the thread-like portion of said nut-like member are evenly spaced.

References Cited

UNITED STATES PATENTS

| 2,633,642 | 4/1953 | Levesque | 74—441X |
| 3,448,632 | 6/1969 | Rumbarger | 74—424.8 |

LEONARD H. GERIN, Primary Examiner

U.S. Cl. X.R.

74—409, 441

TEI-102-A
PO-1050
(5/69)

UNITED STATES PATENT OFFICE
CERTIFICATE OF CORRECTION

Patent No. 3,554,046          Dated January 12, 1971

Inventor(s) WILLIAM H. KIRK

It is certified that error appears in the above-identified patent and that said Letters Patent are hereby corrected as shown below:

IN THE SPECIFICATION

Column 3, line 21, change "as" to - - since - - line 24, after "not" insert - - physically line 58, change "49" to - - 45 - - line 65, change "64" to - - 63 - -

Column 4, line 13, after "helical" insert - - gear - line 18, change "64" to - - 68 - - line 31, change "96" to - - 92 - - line 33, change "96" to - - 92 - - line 38, change "96" to - - 92 - - line 61, change "112" to - - 110 -- line 64, after "advance" delete "of"

Signed and sealed this 18th day of May 1971.

(SEAL)
Attest:

EDWARD M. FLETCHER, JR.          WILLIAM E. SCHUYLER, J
Attesting Officer                 Commissioner of Patent